(12) United States Patent
Zhang

(10) Patent No.: US 9,261,582 B2
(45) Date of Patent: Feb. 16, 2016

(54) INTELLIGENT RADAR DETECTION DEVICE AND METHOD THEREOF

(75) Inventor: Dong Zhang, Shanghai (CN)

(73) Assignee: QUECLINK WIRELESS SOLUTIONS CO., LTD., Shanghai (CN)

( * ) Notice: Subject to any disclaimer, the term of this patent is extended or adjusted under 35 U.S.C. 154(b) by 461 days.

(21) Appl. No.: 13/824,231

(22) PCT Filed: Dec. 15, 2010

(86) PCT No.: PCT/CN2010/079818
§ 371 (c)(1),
(2), (4) Date: Mar. 15, 2013

(87) PCT Pub. No.: WO2012/062008
PCT Pub. Date: May 18, 2012

(65) Prior Publication Data
US 2013/0176160 A1    Jul. 11, 2013

(30) Foreign Application Priority Data

Nov. 9, 2010   (CN) .......................... 2010 1 0537585

(51) Int. Cl.
*G01S 13/91*     (2006.01)
*G01S 7/02*      (2006.01)
*G01S 5/00*      (2006.01)
*G01S 5/02*      (2010.01)

(52) U.S. Cl.
CPC .............. *G01S 7/021* (2013.01); *G01S 5/0027* (2013.01); *G01S 5/0205* (2013.01); *G01S 13/91* (2013.01)

(58) Field of Classification Search
CPC ..... G01S 7/021; G01S 5/0027; G01S 5/0205; G01S 13/91
USPC .......................................... 342/29–37, 57, 61
See application file for complete search history.

(56) References Cited

U.S. PATENT DOCUMENTS

| 7,692,530 | B2  | 4/2010 | Turner et al. |
| 2007/0040677 | A1 | 2/2007 | Blair, Jr. |
| 2007/0155325 | A1* | 7/2007 | Bambic et al. ............... 455/41.2 |

(Continued)

FOREIGN PATENT DOCUMENTS

| CN | 101014152 A | 8/2007 |
| CN | 101027700 A | 8/2007 |

(Continued)

*Primary Examiner* — John B Sotomayor
(74) *Attorney, Agent, or Firm* — Muncy, Geissler, Olds & Lowe, P.C.

(57) ABSTRACT

An intelligent radar detection device and method thereof comprise an airport signal detection device detecting a specific airport signal intensity for judging if the device enters an airport, a radio communication device identifying a takeoff of the airplane and reporting location information of the device after the airplane lands, a GPS device acquiring GPS data to ensure the location information, and a system power respectively connected to the radio communication device, the airport signal detection device, and the GPS device. The radio communication device is respectively connected to the airport signal detection device and the GPS device. The present invention for locating and tracking packages and goods transported through aviation can automatically identifies if the device enters the airport to turn off the radio communication function. The present invention also automatically identifies the takeoff of and the landing of the airplane to turn on the radio communication function.

7 Claims, 4 Drawing Sheets

(56) References Cited

U.S. PATENT DOCUMENTS

2011/0187580 A1* 8/2011 Laenen et al. ............... 342/29
2011/0221624 A1* 9/2011 Kavaler ........................ 342/22
2013/0176160 A1* 7/2013 Zhang .......................... 342/20

FOREIGN PATENT DOCUMENTS

CN        101141715        3/2008
WO    WO 2012062008 A1 *  5/2012

* cited by examiner

INTELLIGENT RADAR DETECTION DEVICE AND METHOD THEREOF

FIELD OF THE INVENTION

The present invention relates to detection device, particularly to intelligent radar detection device and method thereof, the detection device of which is able to automatically turn on or turn off the radio communication function.

DESCRIPTION OF THE RELATED ART

In the logistics system, packages can be transported through aviation. In order to promote the service quality, the GPS tracking device with a radio communication function is commonly provided for locating and tracking the packages that are transported through land routes. However, in view of the strict safety stipulations for flight, the GPS tracking device with the radio communication function cannot be applied to track packages that are transported through aviation. However, many of the packages that are transported through aviation are precious or important. Therefore, it is necessary that these packages should be concurrently tracked while they are transported through aviation. Herein, a special device that automatically turns off the radio communication function for executing GPS tracking before the plane takes off and automatically turned on the radio communication function for executing GPS tracking after landing should be developed. Such special device guarantees the aviation safety and concurrently provides the locating and tracking function of the packages.

Accordingly, the inventor of the present invention endeavors to conquer current shortcomings by providing a device and a method of the same that are able to automatically turn off the radio communication function after entering the airport and automatically turn on the radio communication function after the airplane takes off or lands. Thereby, packages that are transported through aviation can be properly located and tracked.

SUMMARY OF THE INVENTION

The object of the present invention is to provide an intelligent radar detection device and method thereof that are able to automatically turn off the radio communication function after entering the airport and automatically turn on the radio communication function after the airplane takes off or lands. Thereby, packages that are transported through aviation can be properly located and tracked.

The present invention is achieved by the following means:

An intelligent radar detection device comprises an airport signal detection device applied to detect a specific airport signal intensity for judging if the device enters an airport, a radio communication device identifying a takeoff of an airplane and reporting location information of the device after the airplane lands, a GPS device acquiring GPS data to ensure the location information of the device, and a system power;

the radio communication device is respectively connected to the airport signal detection device and the GPS device; the system power is respectively connected to the radio communication device, the airport signal detection device, and the GPS device.

Preferably, the airport signal detection device is an inspection device for secondary surveillance radar signal.

Preferably, the airport signal detection device includes a receiving antenna, an integrated RF transmitter, an intermediate frequency amplifier module, a detection module, a detection output amplifier module, and a memory;

an input end of the integrated RF transmitter is connected to the receiving antenna, and an output end of the integrated RF transmitter is sequentially connected to the intermediate frequency amplifier module, the detection module, the detection output amplifier module, and the memory;

the memory is connected to the integrated RF transmitter through a control circuit, and the integrated RF transmitter receives a reference clock signal.

Preferably, the integrated RF transmitter includes a gain control amplifier, an RF transceiver, and a low-pass filter;

an input end of the gain control amplifier is connected to the receiving antenna, and an output end of the gain control amplifier is connected to an input end of the RF transceiver;

an input end of the low-pass filter is connected to an output end of the RF transceiver, and an output end of the low-pass filter is connected to the intermediate frequency amplifier module.

A detecting method of an intelligent radar cooperates with aforementioned intelligent, radar detection device and includes:

Step (1) after turning on, only a receiving part of a radio communication module being launched;

Step (2) keeping monitoring broadcasting information of a beehive community; if the broadcasting information of the beehive community cannot be detected continuously for n minutes, the receiving part of the radio communication module being closed, and the step (1) being repeated every x hour; if the broadcasting information of the beehive community being detected, step (3) being executed;

Step (3) detecting an airport signal; if the airport signal cannot be detected continuously within m minutes, step (4) being executed; if the airport signal being detected continuously within m minutes, step (7) being executed;

Step (4) launching the radio communication module and detecting the airport signal every y minutes;

Step (5) if the airport signal being detected continuously for in minutes, step (7) being executed; if the airport signal being not detected, but the broadcasting information of the beehive community being monitored continuously for n minutes at the same time, the step (2) being executed;

Step (6) if the airport signal being detected continuously within m minutes, an emitting part of the radio module being closed;

Step (7) if the airport signal being not detected continuously for m minutes, the radio communication module being closed; if the broadcasting information of the beehive community being monitored, the step (4) being executed; if the broadcasting information of the beehive community being not monitored, step (8) being executed; and Step (8) closing the emitting part of the radio communication module; if the airport signal being detected, the step (7) being executed.

Accordingly, the intelligent radar detection device disclosed by the present invention is able to automatically identify if the device enters the airport so as to timely turn of the radio communication function. The present invention is also capable of automatically identifying if the airplane takes off or lands so as to turn on the radio communication function. Thereby, packages that are transported through aviation can be properly located and tracked.

The following figures cooperatively depict the present invention.

DETAILED DESCRIPTION OF THE PREFERRED EMBODIMENTS

Figure 1:
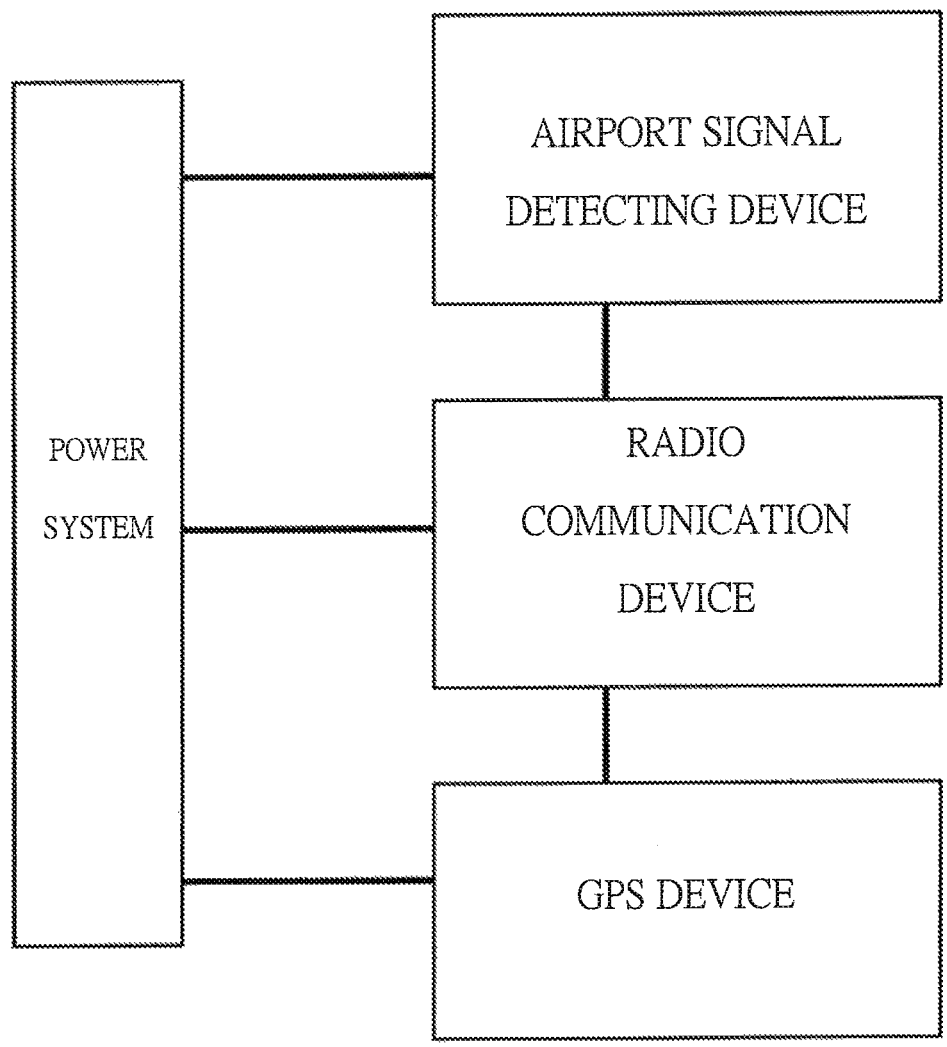
FIG. 1 is a block diagram showing the intelligent radar detection device of the present invention.
Figure 2:
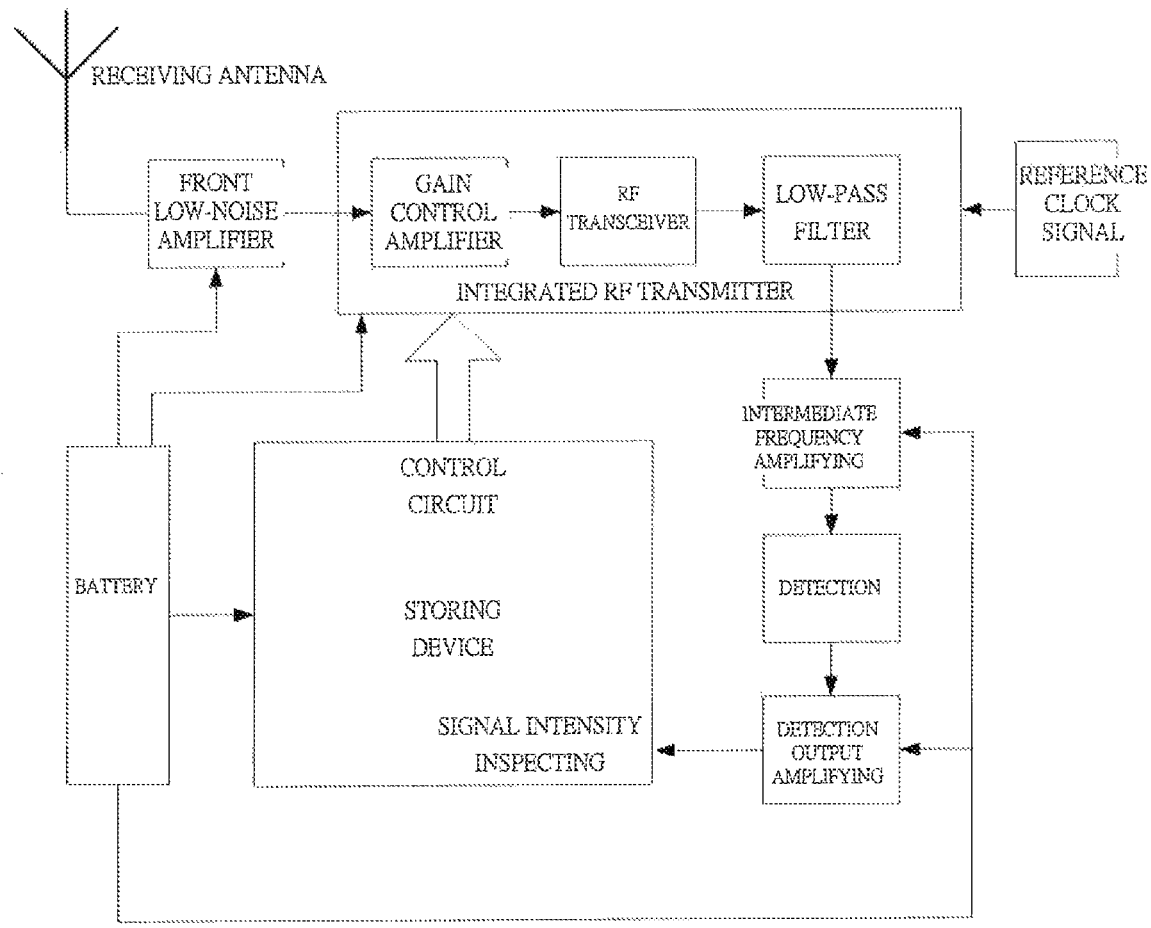
FIG. 2 is a partial block diagram showing an inspection device for secondary surveillance radar signal of the intelligent radar detection device of the present invention.
Figure 3:
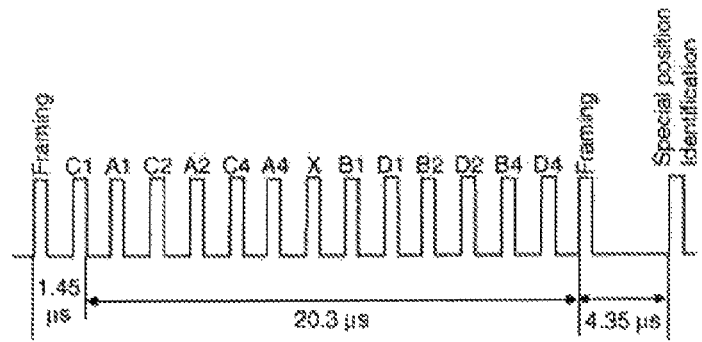
FIG. 3 is a square wave diagram showing a conventional inspection device for secondary surveillance radar signal in an airport.

Referring to FIGS. 1 to 3, an intelligent radar detection device of the present invention comprises an airport signal detection device applied to detect a specific airport signal intensity for judging if the device enters an airport, a radio communication device identifying a takeoff of an airplane and reporting location information of the device after the airplane lands, a GPS device acquiring GPS data to ensure the location information of the device, and a system power. The radio communication device is respectively connected to the airport signal detection device and the GPS device. The system power is respectively connected to the radio communication device, the airport signal detection device, and the GPS device.

The airport signal detection device is an inspection device for secondary surveillance radar signal. The airport signal detection device includes a receiving antenna, an integrated RF transmitter, an intermediate frequency amplifier module, a detection module, a detection output amplifier module, and a memory. An input end of the integrated RF transmitter is connected to the receiving antenna, and an output end of the integrated RF transmitter is sequentially connected to the intermediate frequency amplifier module, the detection module, the detection output amplifier module, and the memory. The memory is connected to the integrated RF transmitter through a control circuit, and the integrated RF transmitter receives a reference clock signal.

The integrated RF transmitter includes a gain control amplifier, an RF transceiver, and a low-pass filter. An input end of the gain control amplifier is connected to the receiving antenna, and an output end of the gain control amplifier is connected to an input end of the RF transceiver. An input end of the low-pass filter is connected to an output end of the RF transceiver, and an output end of the low-pass filter is connected to the intermediate frequency amplifier module.

A detecting method of an intelligent radar cooperates with aforementioned intelligent radar detection device and includes:

Step (1): after turning on, only a receiving part of a radio communication module being launched;

Step (2): keeping monitoring broadcasting information of a beehive community; if the broadcasting information of the beehive community cannot be detected continuously for n minutes, the receiving part of the radio communication module being closed, and the step (1) being repeated every x hour; if the broadcasting information of the beehive community being detected, step (3) being executed;

Step (3): detecting an airport signal; if the airport signal cannot be detected continuously within m minutes, step (4) being executed; if the airport signal being detected continuously within m minutes, step (7) being executed;

Step (4): launching the radio communication module and detecting the airport signal every y minutes;

Step (5): if the airport signal being detected continuously for m minutes, step (7) being executed; if the airport signal being not detected, but the broadcasting information of the beehive community being monitored continuously for n minutes at the same time, the step (2) being executed;

Step (6): if the airport signal being detected continuously within m minutes, an emitting part of the radio module being closed;

Step (7): if the airport signal being not detected continuously for m minutes, the radio communication module being closed; if the broadcasting information of the beehive community being monitored, the step (4) being executed; if the broadcasting information of the beehive community being not monitored, step (8) being executed; and Step (8): closing the emitting part of the radio communication module; if the airport signal being detected, the step (7) being executed.

The intelligent radar detection device of the present invention is operated as follows:

There are mainly four parts of the device of the present invention being concerned. Referring to FIG. 1, the airport signal detection device is able to detect the intensity of specific signals in the airport for judging if the device enters the airport. The device in the present invention adopts the secondary surveillance radar to detect the signal intensity. Generally, the airport signal used in the secondary surveillance radar is a series of pulse as shown in FIG. 2. The hardware is applied to the secondary surveillance radar for monitoring the airport signal.

Wherein, a front low-noise amplifier can be adopted in accordance with the practical needs. The integrated RF transmitter adopts general units for avoiding restriction and saving costs. In the case, the low-pass filter function can be amplified and down converted, and the down-converted low-pass filter is interiorly integrated with an amplifier, a mixer, a phase-locked loop, and a wave filter.

An intermediate frequency signal is amplified, and a peak value detection and a detection output signal are amplified; thereby, these amplified signals are input to MCU for inspecting their magnitude. Wherein, the magnitude in a weak signal and the signals that the antenna receives are in the direct ratio. If the detection output signal is strong enough, the detection output amplifier can be omitted, and the detection output is directly inspected by MCU.

The MCU is a single processing chip or one part of other system. Herein, the MCU is able to emit controlling commands to the integrated RF transmitter and inspect the signal intensity.

The radio communication device is adopted for automatically identifying the takeoff of the airplane and reporting the location information of the device after the airplane lands. This radio communication device includes but is not limited to the GSM communication module, the CDMA/WCDMA, or the CDMA200 communication module.

The GPS device is able to acquire the GPS data for ensuring the location information of the device.

The system power provides the whole device with electricity.

In order to keep a standard operation of the airplane, the radio communication device adopted in the existing cargo tracker has to be turned off manually. This manual operation influences the working efficiency of the logistics system largely. The manual operation is also likely to be carelessly skipped, which results in a hidden danger.

Thus, the present invention utilizes a unique facility that is able to automatically convert the operating mechanism. Namely, a seamless tracking is achievable, and the present invention can be operated without human intervention while identifying the working area of the airplane and turning off the emission of the radio communication device.

There are three operating modes of the present invention:

Standard mode: When the device of the present invention is beyond the airplane area and is not flying, the device is in the standard mode. In the standard mode, the device accomplishes the automatic location, reports through GPRS or SMS periodically, and alarms individual events.

Monitoring mode: When the device enters the airplane area (no matter the device is carried on the land into the airport or the device is carried in the air into the airport), the monitoring mode is automatically launched. In the monitoring mode, the device keeps detecting the airport signal and monitoring the information from the beehive community in the radio communication. However, in the monitoring mode, in order to avoid influencing the taking off and landing of the airplane, the emitting unit of the "radio communication module" stays shut. Thus, the radio communication thereof does not cause any influence on the aviation. In the same time, the device is unable to transmit data through radio communication.

Flight mode: When the device is carried in the air, the "radio communication module" is automatically stopped. Thereby, the radio communication module does not cause any influence on the aviation, and the energy of power consumption can be lessened. In the same time, the device still detects the airplane signal so as to automatically switch the flight mode to the monitoring mode when the airplane lands.

Figure 4:
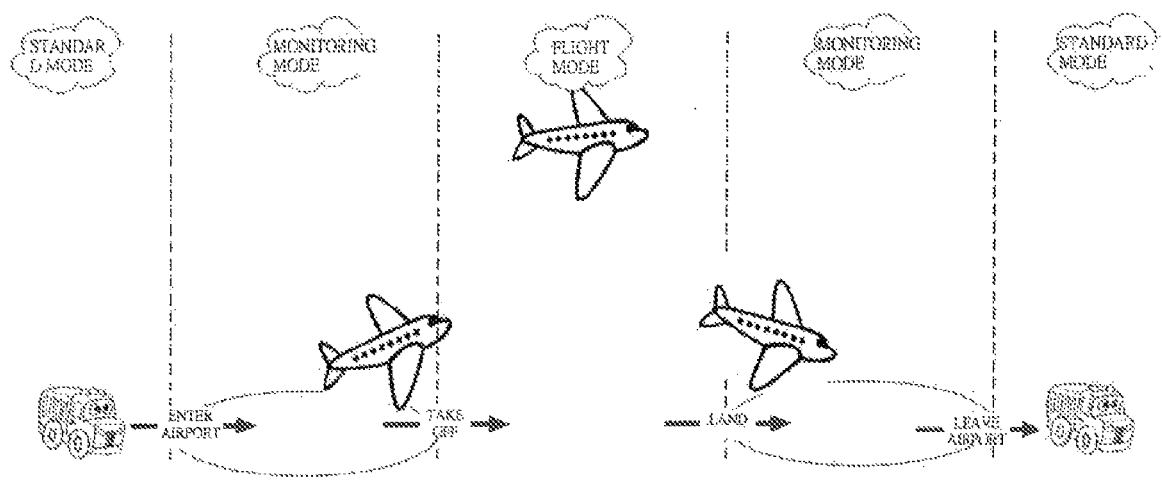
FIG. 4 is a schematic view showing an operation of a conventional intelligent radar detection device.

Referring to FIG. 4, a schematic view is showing an operation of a conventional intelligent, radar detection device.

Conversion of the System Modes

Inspecting means of entering the airport area: the "airport signal detecting module" is able to timely detect if the device is within the airport area currently.

Inspecting means during flying: the emission of the signal from the beehive station of the radio communication has a characteristic that the broadcasting information from the beehive station can not be inspected high up in the air. Further, when the airplane leaves the airport, the "airport signal detecting module" judges that the device is away from the airport. Thus, according to the previous mode (since the airplane always departs from the airport, the mode before leaving must be the monitoring mode), the current mode should be the flight mode.

The states of the present invention are as follows:

Standard mode: the "airport signal detecting module" is launched.

After entering the airport area, the airport signal can be detected, and the device can be converted to the monitoring mode.

Monitoring mode: the "airport signal detecting module" is launched, and the emitting part of the "radio communication module" is stopped, but the receiving part thereof is still launched.

The "airport signal detecting module" detects that the airport signal is lost. Concurrently, the "radio communication module" cannot monitor the broadcasting information of the beehive community through the radio communication. Thus, the flight mode is launched.

The "airport signal detecting module" detects that the airport signal is lost. Concurrently, the "radio communication module" detects the broadcasting information of the beehive community continuously for a period. Thus, the standard mode is launched. The broadcasting information of the beehive community must be monitored for a period because during the airplane is taking off, the airport signal is also lost in view of the leaving away. Wherein, the broadcasting information of the beehive community can be monitored via the radio communication because the airplane is not high up in the air yet, which may incurs state error.

Flight mode: the "airport signal detecting module" is launched, and the "radio communication module" is stopped.

Landing: in the flight mode, the "airport signal detecting module" detects the airport signal again, and the device gets back to the monitoring mode Aforementioned three modes are operated in a normal situation. However, one situation should be paid close attention to if the device is placed in a covered box in the "standard mode", the airport signal cannot be detected even if the device enters the airplane area. Accordingly, the "monitoring mode" is not launched, and the emitting unit of the "radio communication module" is stilled turned on, which may cause a great unseen danger to the aviation.

Thereby, the present invention also provides an exceptional mode the "mask mode". In the "standard mode", the broadcasting information of the beehive community cannot be monitored via the radio communication for a period (the device possibly enters an elevator, a basement garage, or a covered box). Therefore, the "mask mode" is launched. The mask mode works completely the same as that of the "monitoring mode". Namely, the "airport signal detecting module" is launched, and the emitting part of the "radio communication module" is stopped, but the receiving part of the same is switched on.

Figure 5:
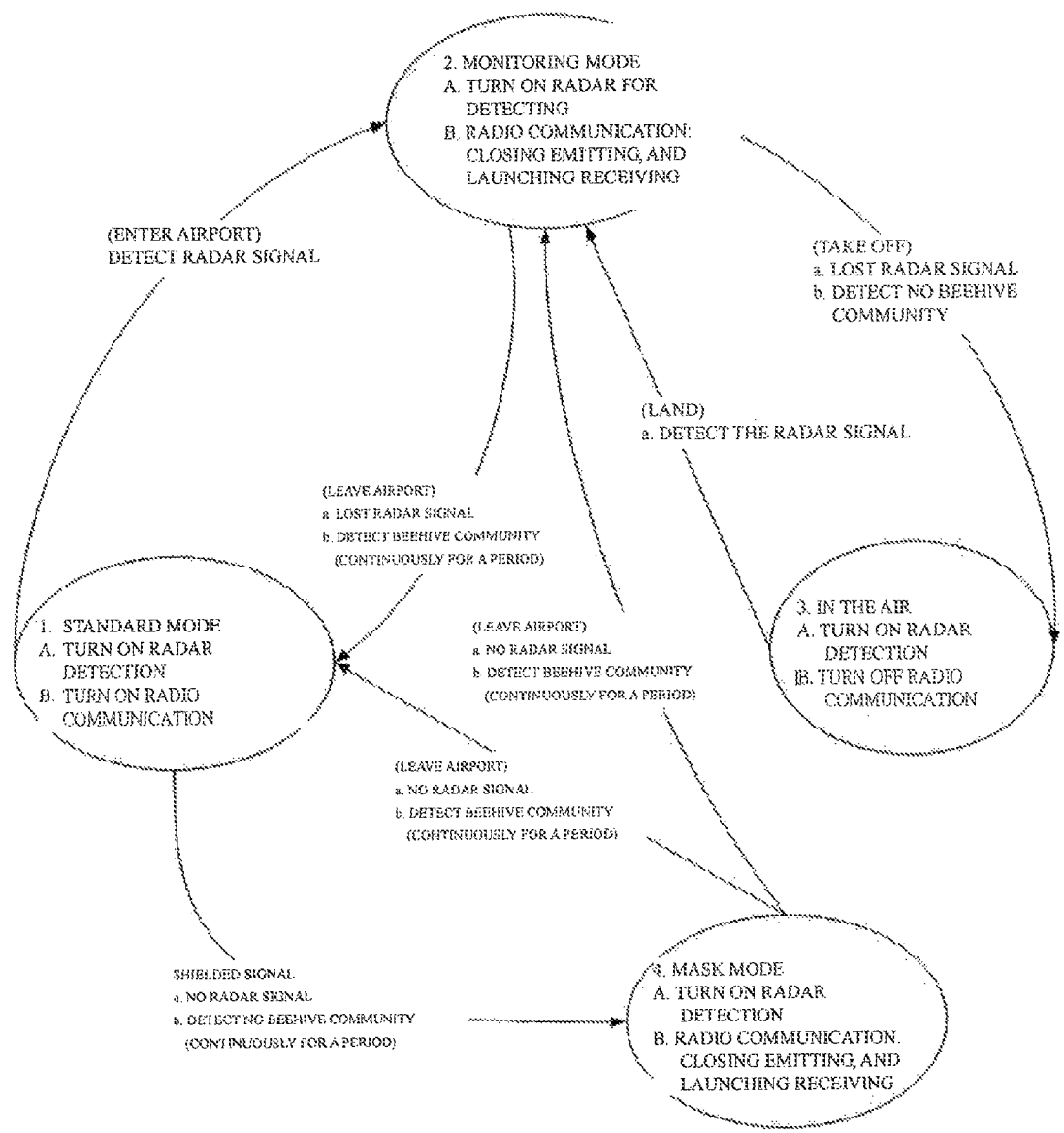
FIG. 5 is a flowchart showing the intelligent radar detection device of the present invention in operation.

Referring to FIG. 5, a flowchart is showing the intelligent radar detection device of the present invention in operation.

The present invention is developed according to a strict concern about any possible occasions. Thus, the airplane would not be influenced by any situations. Moreover, any possible exceptional situations can be timely corrected and back to the standard operating mode.

Turning on the device: in order to avoid directly launching the "standard mode" after the device is turned on in the air, and avoid the emitting unit of the "radio communication module" causing influence on the airplane, the "mask mode" is launched after the device is turned on. Thence, if the broadcasting information of the beehive community is monitored, the "standard mode" or the "monitoring mode" is launched by judging if there is any radar signal detected. If the broadcasting information of the beehive community cannot be monitored all along, the "mask mode" is maintained.

When the device enters the area that is not covered by the beehive community, such as the basement garage, the "mask mode" is launched. Herein, in order to prevent the "mask mode" and the "standard mode" from keeping switching, the beehive community should keep covering for a period, so that the mode can be accordingly switched.

The detecting means of the intelligent radar of the present invention are as follows:

Step 1: after turning on, the device merely provides the receiving part of the "radio communication module". Thence, the device launches the "mask mode". Whereby, the mask mode prevents the device from directly launching the "standard mode" after turning on in the air. The emitting unit of the "radio communication module" is also prevented from influencing the airplane.

Step 2: in the "mask mode", the broadcasting information of the beehive community is kept being monitored. If the broadcasting information of the beehive community cannot be detected continuously for n minutes, the receiving part of the "radio communication module" is closed. Thereby, the step 1 is repeated after x hour. If the broadcasting information of the beehive community is detected, the device is believed within the area of the beehive community, so that the step 3 is executed.

Step 3: Turn on the "airport signal detecting module". If the airport signal cannot be detected continuously within m minutes, the device is believed not within the airport, and the step 4 is executed. If the airport signal can be detected continuously within m minutes, the device is believed within the airport, and the step 7 is executed.

Step 4: the device is in the "standard mode", and its "radio communication mode" is completely turned on for executing the radio communication. Herein, the device can report the GPS data and receives the controlling commands from a far end. Concurrently, the "airport signal detecting module" is switched on every y minute (for saving power and timely detecting).

Step 5: if the airport signal is detected continuously for m minutes in the "standard mode", the device is believed within the airport area, and the step 7 is executed. If the airport signal is not detected, but the broadcasting information of the beehive community is monitored continuously for n minutes, the device is believed in a covered area, and the step 2 is executed.

Step 6: if the airport signal is detected continuously within m minutes via the "airport signal detecting module", the device is going to enter the "monitoring mode". In the same time, the emitting part of the "radio communication module" is going to be closed, but the receiving part of the same is stilled launched.

Step 7: in the "monitoring mode", if the airport signal is not detected continuously for m minutes, the device is believed departing from the airport. However, two situations are possible: if the departure of the device from the airport is through the land route, the device is thence switched to the standard mode. If the device departs from the airport into the air, the "radio communication module" should be closed in order to avoid influencing the airplane. Subsequently, the device judges and distinguishes according to if the broadcasting information of the beehive community is monitored continuously for n minutes. If the broadcasting information of the beehive community can be monitored, the standard mode is launched, and the step 4 is executed. Otherwise, the device is switched to the "flight mode", and the step 8 is executed.

Step 8: In the "flight mode", the emitting part and the receiving part of the "radio communication module" are closed, but the "airport signal detecting module" is still periodically turned on. Therefore, once the airport signal is detected, the device is switched to the "monitoring mode", and the step 7 is executed.

To sum up, the present invention is able to turn off the radio communication function once it automatically identifies that the device enters the airport. The present invention is also capable of automatically identifying whether the airplane takes off or lands so as to turn on the radio communication function. The device and the method of the same of the present invention is suited to the packages that are transported through aviation since the packages can be properly located and tracked.

While we have shown and described the embodiment in accordance with the present invention, it should be clear to those skilled in the art that further embodiments maybe made without departing from the scope of the present invention.

I claim:

1. An intelligent radar detection device comprising:
   an airport signal detection device applied to detect a specific airport signal intensity, and judging if said intelligent radar detection device enters an airport;
   a radio communication device identifying a takeoff of an airplane and reporting location information of said intelligent radar detection device after said airplane lands;
   a GPS device acquiring GPS data to ensure said location information of said intelligent radar detection device; and
   a system power;
   said radio communication device being connected to said airport signal detection device and said GPS device;
   said system power being connected to said radio communication device, said airport signal detection device, and said GPS device.

2. The intelligent radar detection device as claimed in claim 1, wherein, said airport signal detection device is a receiving device for a secondary surveillance radar signal.

3. The intelligent radar detection device as claimed in claim 1, wherein said airport signal detection device includes a receiving antenna, an integrated RF transmitter, an intermediate frequency amplifier module, a detection module, an detection output amplifier module, a control circuit, and a memory;
   an input end of said integrated RF transmitter is connected to said receiving antenna, and an output end of said integrated RF transmitter is sequentially connected to said intermediate frequency amplifier module, said detection module, said detection output amplifier module, and said memory;
   said memory is connected to said integrated RF transmitter through the control circuit.

4. The intelligent radar detection device as claimed in claim 3, wherein, said integrated RF transmitter includes a gain control amplifier, an RF transceiver, and a low-pass filter;
   an input end of said gain control amplifier is connected to said receiving antenna, and an output end of said gain control amplifier is connected to an input end of said RF transceiver;
   an input end of said low-pass filter is connected to an output end of said RF transceiver, and an output end of said low-pass filter is connected to said intermediate frequency amplifier module.

5. A detecting method of an intelligent radar cooperating with said intelligent radar detection device as claimed in claim 1 and including:
   step (1) after turning on, only a receiving part of a radio communication module being initiated;
   step (2) storing monitoring broadcasting information of a mesh network; if said broadcasting information of said mesh network cannot be detected continuously for n minutes, closing said receiving part of said radio communication module, and repeating said step (1) every x hour; if said broadcasting information of said mesh network being detected, executing step (3);
   step (3) detecting an airport signal; if said airport signal cannot be detected continuously within m minutes, executing step (4); if said airport signal being detected continuously within m minutes, executing step (7);
   step (4) initiating said radio communication module and attempting to detect said airport signal every y minutes;
   step (5) if said airport signal is detected continuously for m minutes, executing, step (7); if said airport signal is not detected, said broadcasting information of said beehive community is monitored continuously for n minutes at the same time, and executing said step (2);
   step (6) if said airport signal being detected continuously within m minutes, closing an emitting part of said radio module;

step (7) if said airport signal is not detected continuously for m minutes, closing said radio communication module; if said broadcasting information of said mesh network is monitored, executing said step (4); if said broadcasting information of said mesh network is not being monitored, executing step (8); and step (8) closing said emitting part of said radio communication module; and if said airport signal is detected, executing said step (7).

6. The method of claim 5, wherein n is a first predefined number of minutes and m is a second predefined number of minutes, wherein the first predefined number of minutes and the second predefined number of minutes are not equal, and wherein x is a predefined number of hours.

7. The device of claim 1, wherein said airport signal detection device includes a receiving antenna, an integrated RF transmitter, an intermediate frequency amplifier module, a detection module, an detection output amplifier module, a control circuit, and a memory.

* * * * *